US008773829B2

(12) United States Patent
Som et al.

(10) Patent No.: US 8,773,829 B2
(45) Date of Patent: Jul. 8, 2014

(54) METHOD AND SYSTEM FOR POWER SWING DETECTION IN A GENERATOR

(71) Applicant: General Electric Company, Schenectady, NY (US)

(72) Inventors: Shantanu Som, Dubai (AE); Sumit Bose, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 79 days.

(21) Appl. No.: 13/665,584

(22) Filed: Oct. 31, 2012

(65) Prior Publication Data

US 2014/0118864 A1 May 1, 2014

(51) Int. Cl.
H02H 3/00 (2006.01)

(52) U.S. Cl.
USPC .......... 361/80; 361/1; 361/90; 361/102; 361/114; 361/115; 361/170; 318/140; 318/141; 318/400.21

(58) Field of Classification Search
USPC .......... 318/140, 141, 149, 151, 153, 156, 318/400.21, 400.22; 361/1, 62, 79, 80, 83, 361/88, 89, 90, 93.4, 94, 99, 102, 104, 114, 361/115, 118, 170, 272
See application file for complete search history.

(56) References Cited

U.S. PATENT DOCUMENTS

| 1,935,259 A | 11/1933 | Bergvall |
| 5,566,085 A | 10/1996 | Marceau et al. |
| 5,631,569 A | 5/1997 | Moore et al. |
| 5,731,943 A | 3/1998 | Roberts et al. |
| 6,212,446 B1 | 4/2001 | Sato |
| 6,397,156 B1 | 5/2002 | Bachmann et al. |
| 6,476,521 B1 | 11/2002 | Lof et al. |
| 6,690,175 B2 | 2/2004 | Pinzon et al. |
| 6,778,919 B1 | 8/2004 | Holbach et al. |
| 6,833,711 B1 | 12/2004 | Hou et al. |
| 7,457,088 B2 * | 11/2008 | Hou et al. ............. 361/80 |
| 7,930,117 B2 * | 4/2011 | Guzman-Casillas ....... 702/60 |
| 2003/0040846 A1 | 2/2003 | Rehtanz et al. |
| 2006/0152866 A1 | 7/2006 | Benmouyal et al. |
| 2009/0027066 A1 | 1/2009 | Li et al. |

OTHER PUBLICATIONS

Berdy et al.,"Out of Step Relaying for Generators Working Group Report", IEEE Transaction, vol. PAS-96, No. 5, 1977, pp. 1556-1564.
Mike et al., "Power Swing and Out-Of-Step Considerations on Transmission Lines",Power Swing and Out-Of-Step Considerations on Transmission Lines IEEE PSRC WG D6, Issue Date: Jul. 19, 2005, 59 Pages.

(Continued)

Primary Examiner — Antony M Paul
(74) Attorney, Agent, or Firm — Ann M. Agosti

(57) ABSTRACT

A generator protection device is provided. The generator protection device includes a safety factor estimation module configured to estimate a safety factor as a function of a terminal voltage ($V_S$) of a source-end generator, and a swing center voltage (SCV) between the source-end generator and a receiving-end generator. The system further includes a comparison module configured to compare the estimated safety factor with a defined safety threshold limit, and a decision module configured to trigger an alarm or a generator circuit breaker trip action or both, based on the comparison between the estimated safety factor and the defined safety threshold limit.

20 Claims, 9 Drawing Sheets

(56) References Cited

OTHER PUBLICATIONS

Sumina et al., "Determination of Load Angle for Salient-pole Synchronous Machine", Measurement Science Review, vol. 10, No. 3, 2010, pp. 89-96.

J.Berdy.,"Out-of-Step Protection for Generators", Electric Utility Systems Engineering Department General Electric Company,Schenectady, New York, Downloaded from the Internet:<http://store.gedigitalenergy.com/FAQ/Documents/G60/GER-3179.pdf> on Oct. 31, 2012, 28 Pages.

John Berdy.,"Application of Out-of-Step Blocking and Tripping Relays", Downloaded from the Internet:<http://store.gedigitalenergy.com/faq/Documents/Alps/GER-3180.pdf>, on Oct. 31 2012, 24 Pages.

\* cited by examiner

METHOD AND SYSTEM FOR POWER SWING DETECTION IN A GENERATOR

BACKGROUND

An electrical power system operates under a steady-state condition when there exists a balance between generated and consumed active power for the system. Power system disturbances may cause oscillations in machine rotor angles that can result in conditions like a power swing, when internal voltages of system generators slip relative to each other. Power system faults, line switching, generator disconnection, and the loss or sudden application of large amounts of load are examples of system disturbances that may cause the power swing event to occur in the system. Depending on the severity of the disturbance and power system control actions, the system may return to a stable state or experience a large separation of load angle and eventually lose synchronism. Large power swings, stable or unstable, may cause unwanted relay operations at different locations in the system, which can aggravate the system disturbance and can result in major power outages or blackouts.

Further, asynchronous operation of interconnected generators in the power system as an effect of unstable power swing may initiate uncontrolled tripping of circuit breakers resulting in equipment damage and posing a safety concern for utility operators. Therefore, the asynchronous system areas may need to be separated from each other quickly and dynamically in order to avoid extensive equipment damage and shutdown of major portions of the system. In order to contain these risks, it is required as per international standards to have an optimal generator protection device such as a generator relay in place to isolate generators from rest of the system within a half-slip cycle. The need to meet the international standards challenges protection engineers to ensure selective and reliable relay operation.

In a conventional relaying approach, a variation in system impedance determined at generator terminals is analyzed for detecting power swing. Various impedance-based protection approaches including power swing block (PSB) and out-of step trip (OST) are being currently used. However, these protection approaches may need an extensive power system stability study to arrive at an optimal setting for selective and reliable relay operation. Protection engineers typically use preliminary settings that are not adapted to accommodate variation in system configurations or operational dynamics, for example, changes in transmission and distribution layout during implementation phase or dynamically during operational phase. Extensive study and non-dynamic preliminary settings may result in the protection device being unable to selectively, reliably and dependably detect unstable power swings and isolate generators during such events.

Other known relaying approaches estimate swing center voltage (SCV) for detecting power swings. Such approaches use approximate estimation that does not take into consideration real time power system dynamics. In some relaying approaches, a high-speed communication network such as fiber optic or global positioning system (GPS) communication is used to obtain data at a source end from one or more generators at receiving end(s), which is at a remote location from the source end, for SCV estimation. However, such approaches have economic challenges due to cost associated with implementing and maintaining high-speed communication network. Moreover, such approaches may require data to be determined at the receiving end and then time synchronize the receiving end data with data determined at the source end.

BRIEF DESCRIPTION

In accordance with one embodiment, a generator protection device is provided. The generator protection device includes a safety factor estimation module configured to estimate a safety factor as a function of a terminal voltage ($V_S$) of a source-end generator, and a swing center voltage (SCV) between the source-end generator and a receiving-end generator. The generator protection device further includes a comparison module configured to compare the estimated safety factor with a defined safety threshold limit, and a decision module configured to trigger an alarm or a generator circuit breaker trip action or both, based on the comparison between the estimated safety factor and the defined safety threshold limit.

DRAWINGS

These and other features and aspects of embodiments of the present invention will become better understood when the following detailed description is read with reference to the accompanying drawings in which like characters represent like parts throughout the drawings, wherein.

Figure 5:
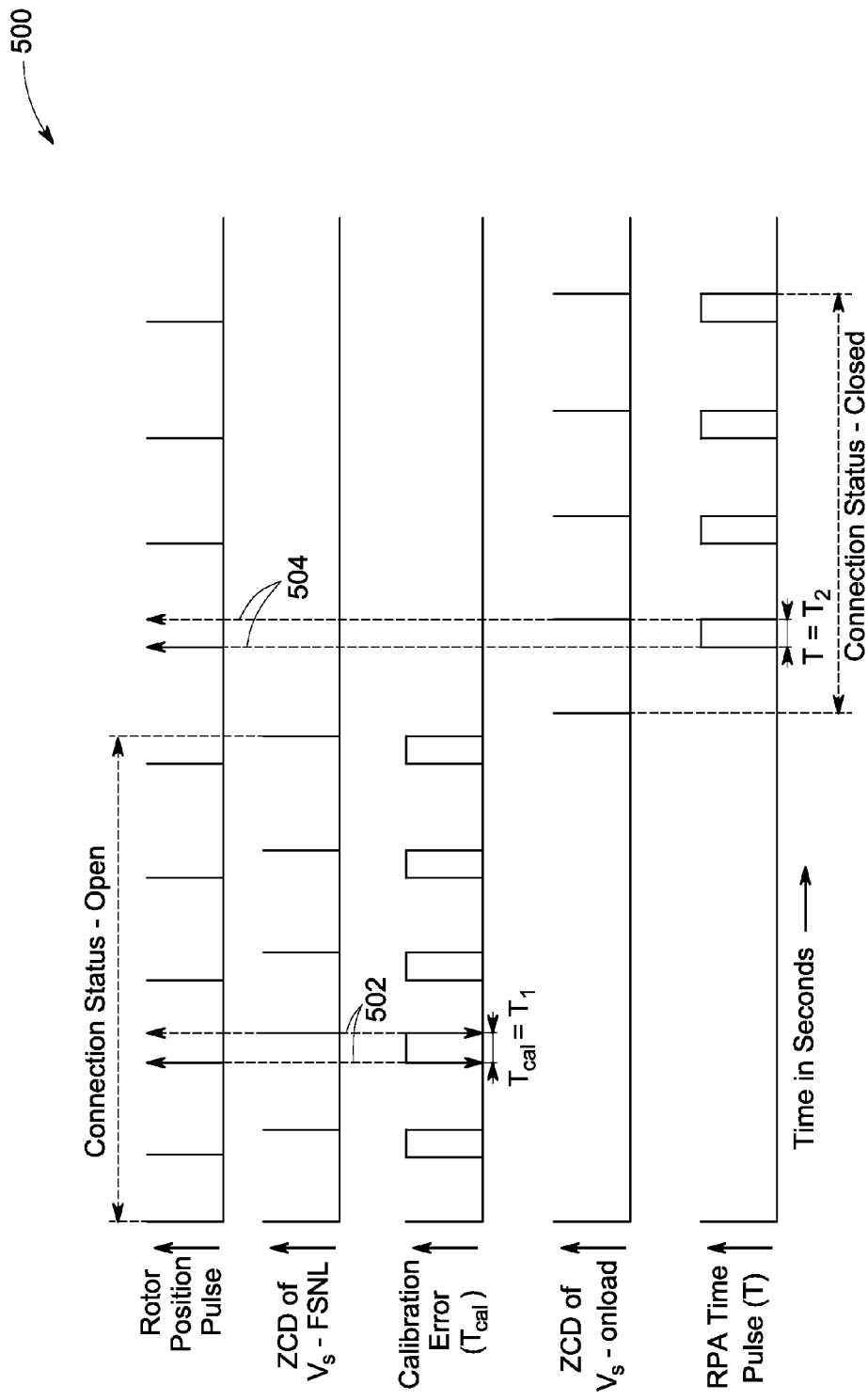

FIG. 5 provides a graphical representation for determining a rotor position angle ($\delta_1$) using a RPA module, in accordance with one embodiment of the invention.

Figure 6:
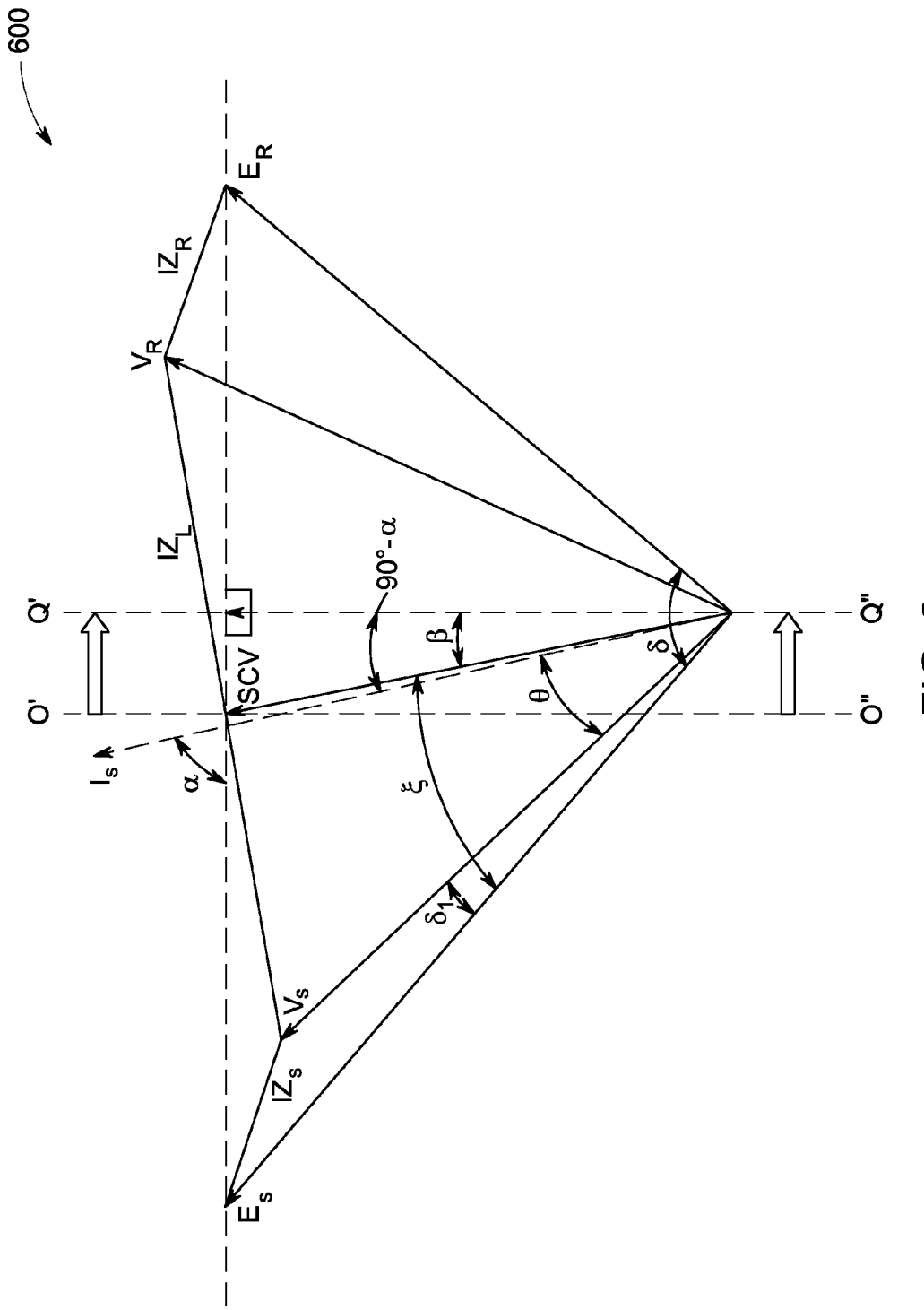

FIG. 6 is a vector phasor representation of the two sources, where $E_S$ is greater than $E_R$, in accordance with another embodiment of the invention.

Figure 7:
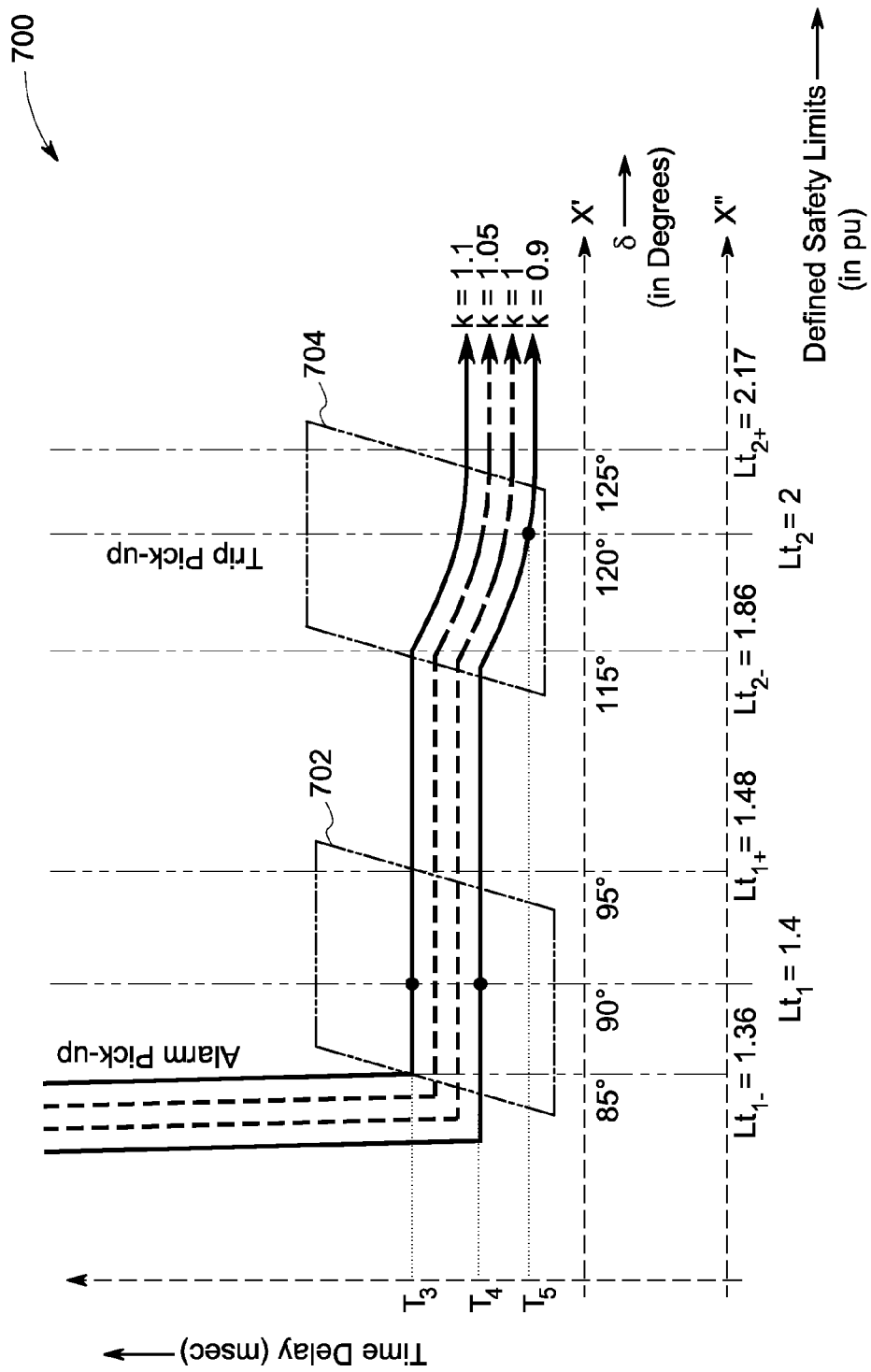

FIG. 7 depicts a graphical representation of time delayed triggering of an alarm or a generator circuit breaker trip action based on estimated safety factors, in accordance with one embodiment of the invention.

Figure 8:
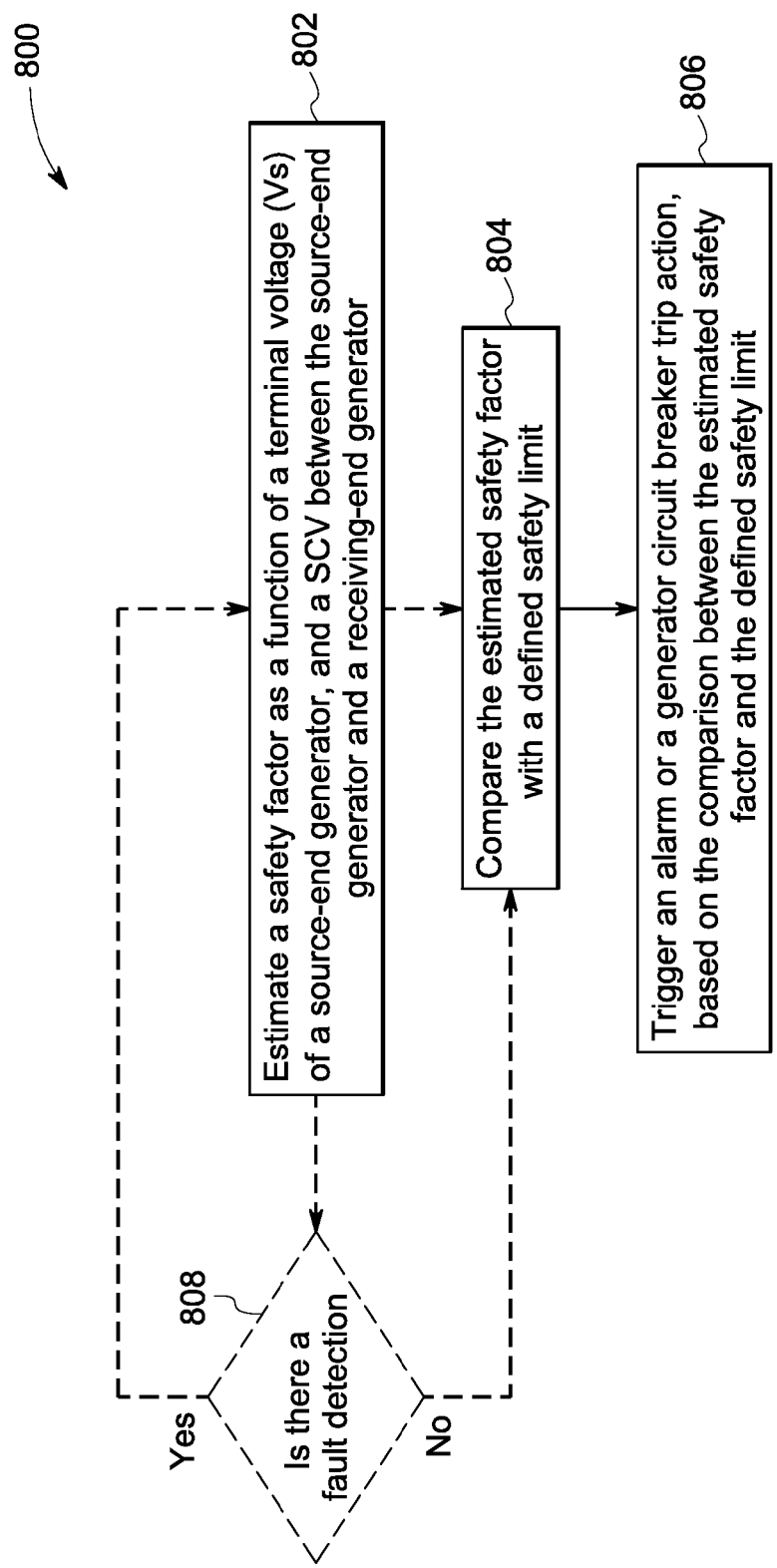

FIG. 8 is a flowchart depicting a method for protection of a source-end generator, in accordance with one embodiment of the invention.

Figure 9:
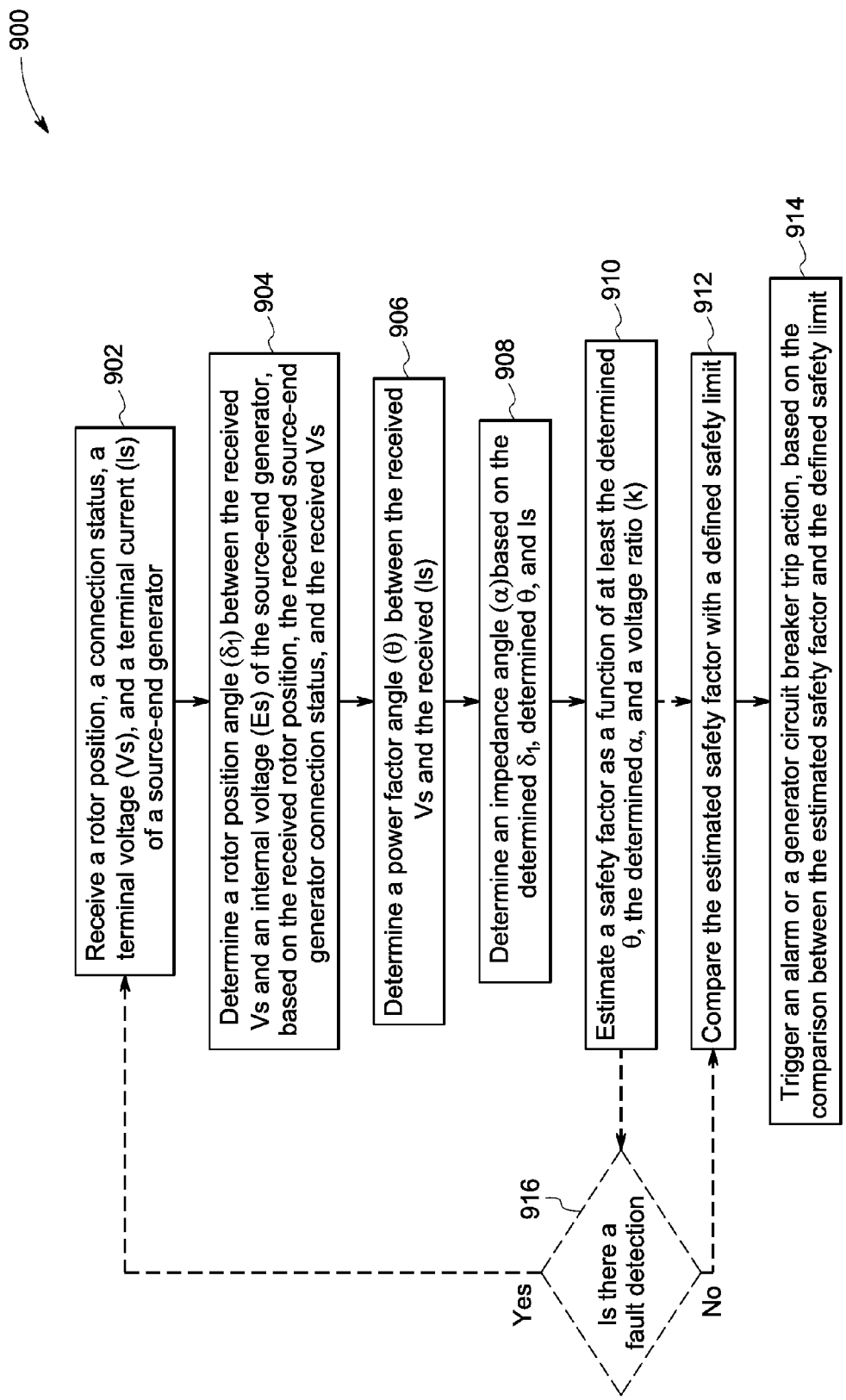

FIG. 9 is a flowchart depicting a method for protection of the source-end generator, in accordance with another embodiment of the invention.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of terms such as "including," "comprising," or "having" and variations thereof herein are meant to encompass the items listed thereafter and equivalents thereof as well as additional items. The terms "module," "controller," "processing unit," "storage unit," and "input/output (I/O unit)" may include either a single component or a plurality of components, which are either active, or passive, or both, and are connected or otherwise coupled together to provide the described function.

Additionally, for purposes of explanation, specific numbers, materials, and configurations are set forth in order to provide a thorough understanding of various embodiments of the invention. The skilled artisan will recognize the interchangeability of various features from different embodiments. Similarly, the various method steps and features described, as well as other known equivalents for each such methods and features, can be mixed and matched by one of ordinary skill in this art to construct additional assemblies and techniques in accordance with principles of this disclosure.

Various embodiments of the present invention provide devices and methods to detect whether a power swing event (herein referred to as "power swing") is stable or unstable based on real-time data measurement. The devices and methods estimate the nature of system disturbance dynamically and isolate the generator from the rest of the system or trigger an alarm or both, when the power swing event is unstable in nature. Related systems are also presented.

In one embodiment, a generator protection device and a related electrical power system is presented.

Figure 1:
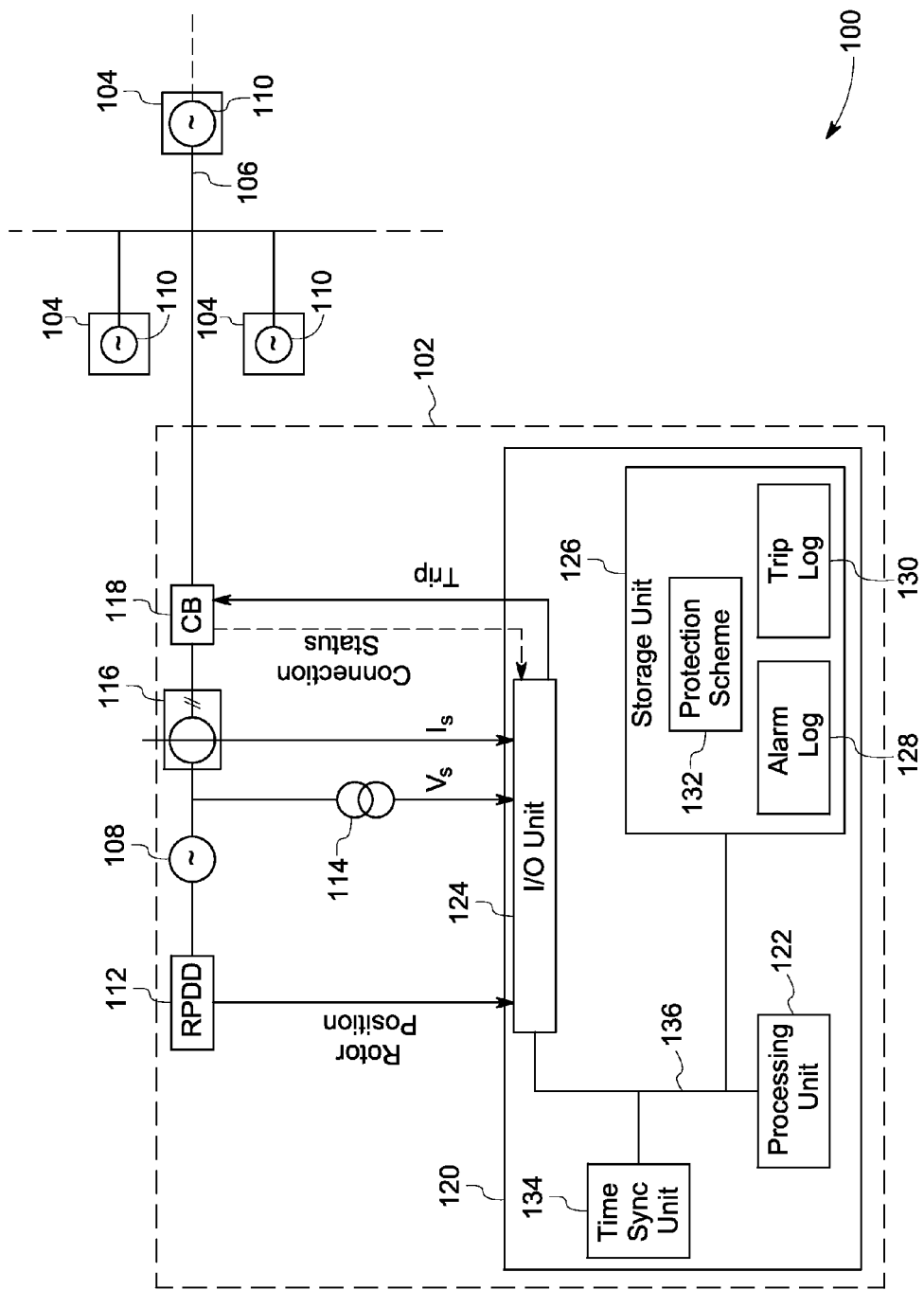
FIG. 1 depicts an electrical power system having multiple generators inter-connected in a mesh arrangement, in accordance with one embodiment of the invention.

FIG. 1 depicts an electrical power system 100 (herein referred to as "system 100") having multiple generators interconnected in a mesh arrangement, in accordance with one embodiment of the invention. The system 100 may be used for interconnecting alternating current (AC) power grids or microgrids. The system 100 includes a source-end 102 and one or more receiving-ends 104. The term "source-end" as used herein refers to a transmitting end of the system 100 and the term "receiving-end" refers to an end that receives power transmitted from the source-end 102 via a transmission link 106 such as, but not limited to, a transmission cable or a transmission line. As shown in FIG. 1, the source-end 102 includes a generator 108 (herein referred to as a "source-end generator 108") and each receiving-end 104 includes a generator 110 (herein together referred to as "receiving-end generator(s) 110"), which is configured to be electrically coupled to the source-end generator 108. In some other embodiments, each receiving-end 104 may include a plurality of generators (not shown), instead of a single receiving-end generator 110 shown in FIG. 1. It will be apparent to a person skilled in the art that power swing may occur between two generators or between two groups of generators. For example, although FIG. 1 illustrates three receiving-end generator(s) 110; however, any number of receiving-end generators may be deployed instead of the exemplary three receiving-end generator(s) 110 in the power system 100 without deviating from the scope of the invention. Similarly, a plurality of source-end generators may be deployed in the system 100 instead of a single source-end generator 108 shown in FIG. 1, in accordance with some embodiments of the invention. In such embodiments, every source-end generator may include a protection scheme as described later.

In some embodiments, the source-end generator 108 and the receiving-end generator(s) 110 may be-rotating at, or close to, synchronous speed, with load angle (δ) differences between these generators remaining nearly constant under steady-state conditions. The term "load angle (δ)" herein refers to a phase angular separation between the source-end and receiving-end generators. δ provides information about a generator's operating point relative to its safety limit, in accordance with some embodiments.

Components illustrated in the system 100 are exemplary and may also include various other components (not shown in FIG. 1) such as, but not limited to, a turbine connected to the source-end generator 108, an automatic voltage regulator (AVR), a step-up transformer, a line-side breaker, one or more electrical loads, a generator control panel, a turbine control panel, and a distributed control system.

The system 100 of FIG. 1 further includes a rotor position determination device (RPDD) 112. In one embodiment, the rotor position determination device 112 may be a sensing device, for example, a Keyphasor® for sensing the position of a generator rotor (not shown) relative to a generator's stator frame (not shown). The Keyphasor® may be mounted on a turbine-generator shaft at the source end 102, in accordance with some embodiments. The Keyphasor® may generate about 3000 pulse signals per minute for a 50 Hertz (Hz) system or 3600 pulse signals per minute for a 60 Hz system. Alternatively, in another embodiment, the rotor position determination device 112 may determine the rotor position using any of the known techniques such as sensor-based or sensor-less rotor position measurement or estimation. The term "rotor position" herein refers to an angular position of the generator rotor relative to the generator's stator frame.

The source-end 102 further includes a voltage transformer 114 for measuring a terminal voltage ($V_S$) of the source-end generator 108, and a current transformer 116 for measuring a terminal current ($I_S$) of the source-end generator 108. Although a single voltage transformer 114 and a single current transformer 116 are shown in FIG. 1; however, any number of current and voltage transformers may be deployed in the system 100 for sensing of $I_S$ and $V_S$.

As shown in FIG. 1, the system 100 further includes a circuit breaker (CB) 118 at the source-end 102. In some embodiments, the circuit breaker 118 may be configured to electrically couple/decouple the source-end generator 108 with/from the receiving-end generator(s) 110. In one embodiment, the circuit breaker 118 may be a 52G generator circuit breaker. The circuit breaker 118 may be further configured to generate a connection status of the source-end generator 108. The term "connection status" as used herein refers to a status of the source-end generator 108 that indicates whether it is electrically connected to or disconnected from the rest of the system 100. In one embodiment, a high signal (for example, binary 1) may indicate that the circuit breaker 118 is closed and the source-end generator 108 is connected to the system 100, whereas a low signal (for example, binary 0) may indicate that the circuit breaker 118 is open and the source-end generator 108 is electrically disconnected from the system 100. In some embodiments, the connection status may be determined using other means. In one exemplary embodiment, current feedback such as presence or absence of $I_S$ may be used to determine the connection status of the source-end generator 108. In another embodiment, a combination of current feedback and circuit breaker position feedback may be used to determine the connection status of the source-end generator 108. In some embodiments, the circuit breaker 118, the rotor position determination unit 112, the voltage transformer 114 and the current transformer 116 may measure the corresponding data (such as, connection status, rotor position, Vs, Is, and the like) in real-time. In one embodiment, real-time may refer to occurrence of event instantaneously, for example, in the order of milliseconds or microseconds. In another embodiment, real-time may be near real-time having a predetermined tolerance (for example, two percent) with respect to instantaneous real-time. In one exemplary embodiment where the data is received near real-time, a utility operator or a protection engineer viewing the data (for example at an I/O terminal) may not perceive any delay during display of data.

As shown in FIG. 1, the system 100 further includes a generator protection device 120 (herein referred to as "device 120") at the source-end 102. The term "generator protection device" as used herein refers to a component that is configured to protect the source-end generator 108 during an unstable power swing event by triggering the circuit breaker 118 to trip (herein referred to as a "generator circuit breaker trip action") or by triggering an alarm, when such an event is detected. Tripping the circuit breaker 118 may result in the source-end generator 108 to be isolated or decoupled from the rest of the system 100. The device 120 may be a protection relay, such as, but not limited to, a digital, numeric, static, or electromechanical protection relay, in accordance with some embodiments. An unstable power swing or an out-of-step event may be a result of a disturbance that can cause a system (such as 100) to be removed from its steady-state condition. Following the disturbance, if δ between two generators eventually stabilize at a new operating value, for example, less than 90 degrees, the system is stable; otherwise the system is considered unstable.

Further, as illustrated in FIG. 1, the device 120 may include a processing unit 122 for analyzing data that is received at and transmitted from an I/O unit 124 in the device 120, using a protection scheme 132 residing in a storage unit 126. The processing unit 122 may include, for example, one or more application-specific processors, graphical processing units, digital signal processors, microcomputers, microcontrollers, application specific integrated circuits (ASICs), field programmable gate arrays (FPGAs), or other suitable devices in communication with one or more components of the system 100. In some embodiments, the processing unit 122 may execute program code, such as the protection scheme 132, which is at least partially stored in the storage unit 126. While executing program code, the processing unit 122 may process data, which can result in reading transformed data such as alarm log 128 or trip log 130 from the storage unit 126, or writing to the I/O unit 124. Further, as shown in FIG. 1, a communication bus 136 may provide a communications link between each of the components in the device 120. The I/O unit 124 may comprise one or more human I/O devices, which enable a utility operator or a protection engineer to communicate with the device 120 or one or more communications devices using any type of communications link.

As used herein, the term "unit" within the device 120 uses any configuration of hardware, with or without software, which implements the functionality described in conjunction therewith using any solution. Also, the term "module" herein refers to program code that enables the processing unit 122 to implement the actions described in conjunction therewith using any solution. Regardless, it is understood that two or more units, modules, or systems may share some or all of their respective hardware or software. Moreover, when the system 100 includes various computing components such as, but not limited to, generator control panel, turbine control panel, and distributed control system, these components may communicate over any type of communication link. Further, while performing a process described herein, the device 120 may communicate with one or more other computing components using any type of communications link. In some embodiments, the communications link may include, but not limited to, wired links such as optical fiber, or wireless links. Further, the system 100 may further include any combination of one or more types of networks, or utilize any combination of various types of transmission techniques and protocols.

In some embodiments, the I/O unit 124 may interface with the rotor position determination unit 112, the voltage transformer 114, the current transformer 116, and the circuit breaker 118 to receive data such as the rotor position, the $V_S$, the $I_S$, and the connection status, respectively. The rotor position, the $V_S$, and the $I_S$ may be analog inputs, for example, in the form of sine waveforms or square pulses, in accordance with certain embodiments. In one embodiment, the I/O unit 124 may be configured to filter noise and then convert the filtered analog input into digital samples. In another embodiment, during an unstable power swing event, the I/O unit 124 may be configured to trigger an alarm, or send a trip command to the circuit breaker 118 to trip the circuit breaker 118, or both. In certain embodiments, the processing unit 122 may store the received, processed, and transmitted data to, or may read from, the storage unit 126, such as a hard disk drive, a floppy disk drive, a compact disk-read/write (CD-R/W) drive, a digital versatile disc (DVD) drive, a flash drive, or a solid-state storage device. In one embodiment, the storage unit 126 may store the alarm log 128 and the trip log 130 triggered by the processing unit 122 during unstable power swing events.

Various embodiments of the invention deploy the protection scheme 132 in the device 120 that is configured to detect whether a power swing event is stable or unstable based on real-time data measurement. The term "protection scheme" herein refers to logic defined to selectively, reliably, and dependably protect the source-end generator 108 during unstable power swings, and retain the source-end generator 108 in operation during stable power swings. In embodiments where the protection scheme 132 determines that the disturbance in the system 100 is an unstable power swing, the device 120 protects the source-end generator by triggering the alarm, generator circuit breaker trip action, or both. Various embodiments of the protection schemes are described in detail later in conjunction with FIGS. 2 and 4.

The device 120 may further include a time sync unit 134, which may be configured to receive time sync signal(s) from an external time synchronizing device to synchronize the device 120's internal clock, by means of which the device 120 may be synchronized with the absolute time. Any known technique for time synchronizing data, such as global positioning system (GPS) or timing protocols may be used without deviating from the scope of the invention. In some embodiments, various components of the device 120 may communicate with each other via a communication bus 136.

One or more components shown in FIG. 1 may be integrated into a single component. For example, the time sync unit 134 may be integrated with the I/O unit 124. Also, the functionalities of a component of the device 120 may be segregated or distributed across multiple components. For example, some or all logic of the protection scheme 132 may be stored in the storage unit 126 and processed in the processing unit 122. In some embodiments, the functionalities of the I/O unit 124 may be integrated into one or more modules of the protection scheme 132, in which case the I/O unit 124 may be omitted.

Figure 2:
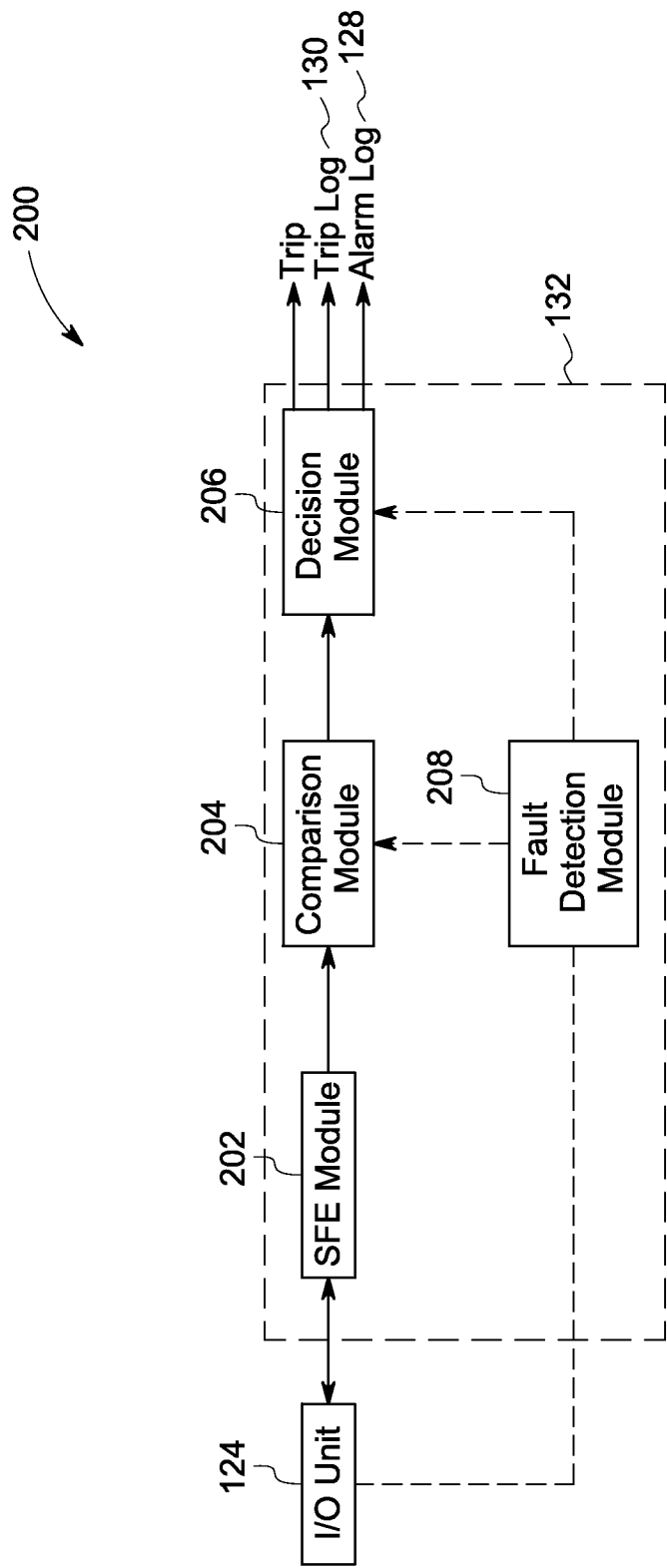
FIG. 2 is a block diagram of a protection device, in accordance with one embodiment of the invention.

FIG. 2 is a block diagram of a generator protection device 200 (herein referred to as "device 200"), in accordance with one embodiment of the invention. The device 200 is similar to the device 120, except that a detailed view of the protection scheme 132 is shown in FIG. 2. In some embodiments, various components of the device 120 may be equally implemented in the device 200. As shown in FIG. 2, in some embodiments, the protection scheme 132 includes a safety factor estimation (SFE) module 202 coupled to the I/O unit 124. In some embodiments, the SFE module 202 may be configured to estimate a safety factor as a function of $V_S$ and a swing center voltage (SCV) between the source-end generator 108 and the receiving-end generator(s) 110. It will be apparent to a person skilled in the art that SCV is the voltage at a location in between a two-source equivalent system where the voltage is zero when the angle between the two sources is 180 degrees apart.

In some other embodiments, the safety factor may be calculated as a ratio of $V_S$ and SCV. In certain embodiments, this ratio may be determined based on real-time measured data and various angles determined by a protection scheme, as described later in conjunction with FIG. 4. The term "safety factor" as used herein refers to a safety margin determined for the source-end generator 108 such that a safety factor value below a defined safety threshold limit (herein referred to as "defined safety limit") signifies a stable power swing, and once this limit is reached or exceeded, the system 100 is determined to have incurred an unstable power swing. Also, the term "defined safety limit" is a pre-defined safety value that is determined from $\delta$ (which is in degrees) as a per unit (pu) value. In some embodiments, $\delta$ and the defined safety limits may be defined and adjusted by a utility operator or a protection engineer, as will be described in detail later in conjunction with FIG. 7. The determination as to whether the estimated safety factor is below or above the defined safety limit may be performed by a comparison module 204 in the protection scheme 132, in accordance with some embodiments. In some embodiments, the comparison module 204 may compare the estimated safety factor with the defined safety limit.

As shown in FIG. 2, the protection scheme 132 further includes a decision module 206 that may be configured to trigger an alarm, a generator circuit breaker trip action, or both, based on the output of the comparison between the estimated safety factor and defined safety limit. In one embodiment, the decision module 206 may trigger the alarm, for example, after a delay when the estimated safety factor is equal to or greater than a first defined safety limit. In another embodiment, the decision module 206 may trigger the generator circuit breaker trip action, for example, after a delay when the estimated safety factor is equal to or greater than a second defined safety limit. In some embodiments, the second defined safety limit may be greater than the first defined safety limit.

In some embodiments, when the safety factor is equal to or greater than the second defined safety limit, the decision module 206 may be configured to send an out-of-step trip (OST) command to the circuit breaker 118 so as to trip the circuit breaker 118 and thereby isolate the source-end generator 108 from the rest of the system (such as 100). It will be apparent to a person skilled in the art that OST may be used to island certain locations/components (such as the source-end generator 108 in this case) from other components during unstable power swings and prevent any possible damages. The alarm log 128 and the trip log 130 may be stored in the storage unit 126 for future reference or analysis.

As shown in FIG. 2, in some embodiments, the protection scheme 132 may further include a fault detection module 208 that may be configured to detect a fault (such as, a phase-phase fault or a ground fault) at a component proximal to the source-end generator 108. Any known technique of detecting phase-phase or ground fault may be used. For example, the phase-phase or ground fault may be determined by the known technique of monitoring three phases in the Vs, which may be received at the fault detection module 208 from the I/O unit 124. In this example, phase-phase or phase-ground voltage below a defined threshold voltage value may trigger a fault. In certain exemplary embodiments, the fault may be detected at a step-up transformer (not shown in FIG. 1) associated with the source-end generator 108. In other exemplary embodiments, the fault may be detected at a line-side circuit breaker (not shown in FIG. 1) that may be configured to electrically connect or disconnect individual power lines.

In some embodiments, detection of the fault by the fault detection module 208 may trigger the deactivation of some or all modules of the protection scheme 132. In one exemplary embodiment, detection of the fault may trigger the fault detection module 208 to send a disable signal to the comparison module 204 or the decision module 206 or both such that comparison of data analyzed for triggering of alarm and the generation circuit breaker trip action may be precluded. In some embodiments, the alarm may be avoided or stopped by deactivation of the alarm by the decision module 206, and the generation circuit breaker trip action may be precluded, that is, if not already triggered. In some embodiments, the source-end 102 may include a generator protection device, for example, a G60 generator protection universal relay (UR) family or the like to trip the circuit breaker 118 in the event of the fault detection by the fault detection module 208. A separate phase-phase or ground fault detection scheme or algorithm may be used without deviating from the scope of the invention. In some embodiments, the protection scheme may also be developed in the G60 generator protection relay or the like.

Figure 4:
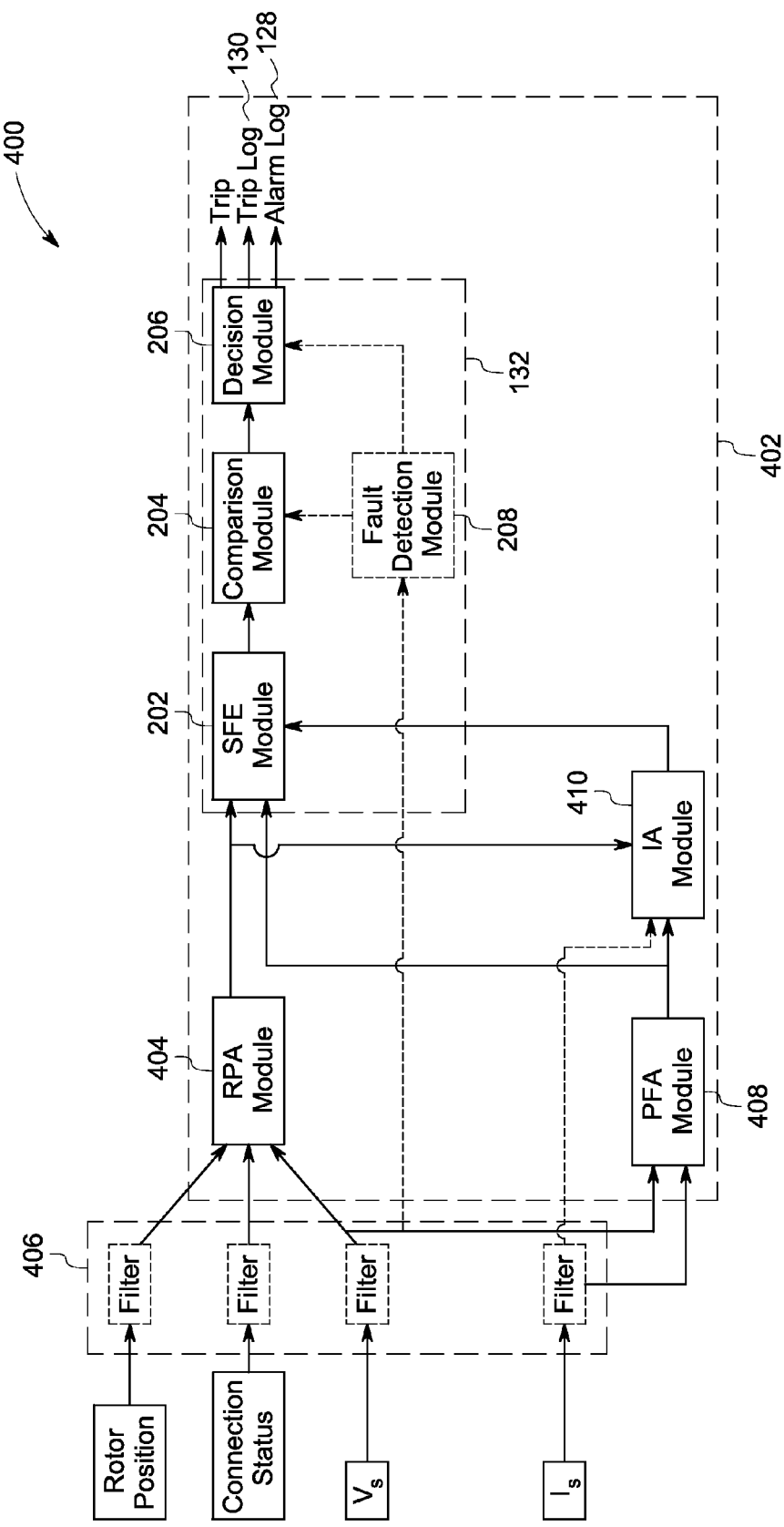
FIG. 4 is a block diagram of a protection device, in accordance with another embodiment of the invention.

FIG. 2 above describes the protection scheme 132, in accordance with the one embodiment. FIG. 4 is a block diagram of a generator protection device 400 (herein referred to as "device 400"), in accordance with another embodiment of the invention. The device 400 is similar to the device 200, except that the I/O unit 124 is not shown in FIG. 4 and the protection scheme 132 is replaced with a protection scheme 402. Various embodiments described above for the device 200 may be equally applicable for the device 400. The protection scheme 402 may include various other modules in addition to the modules of the protection scheme 132. As shown in FIG. 4, in some embodiments, the protection scheme 402 includes a rotor position angle determination module 404 (herein referred to as "RPA module 404") that may be configured to receive the connection status, and the samples of the rotor position and the $V_S$ via one or more optional filters 406 (shown in a dashed box). In one exemplary embodiment, the filters 406 may be low pass filters that may be configured to process any data received from the I/O unit 124 to eliminate noise. In another exemplary embodiment, the filters 406 may be integrated with the I/O unit 124 (not shown).

Figure 3:
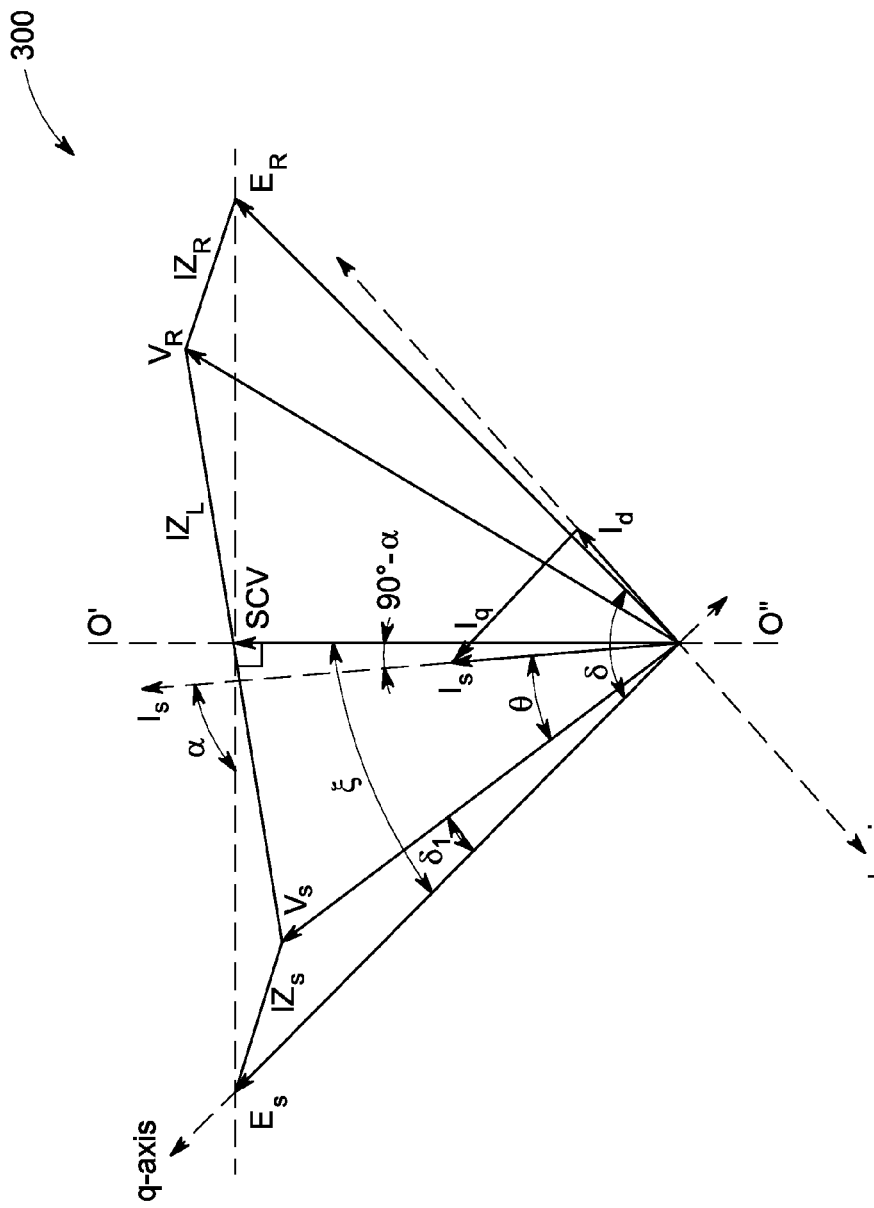
FIG. 3 is a vector phasor representation of two sources, where $E_S$ is equal to $E_R$, in accordance with one embodiment of the invention.

In some embodiments, the RPA module 404 may be configured to determine a rotor position angle ($\delta_1$), which is an angular separation between the received $V_S$ and an internal voltage ($E_S$) of the source-end generator (as shown in FIG. 3), based on the received data, such as, rotor position, connection status, and $V_S$. Alternatively, in some other embodiments, $\delta_1$ may be determined based on the rotor position, connection status, and a positive sequence component of $V_S$. The details of determining $\delta_1$ are described in detail later in conjunction with FIG. 5.

As shown in FIG. 4, in some embodiments, the protection scheme 402 further includes a power factor angle determination module 408 (herein referred to as "PFA module 408") that may be configured to receive the samples of $V_S$ and $I_S$ via the filters 406. In one embodiment, the PFA module 408 may be further configured to determine a power factor angle ($\theta$) between the received $V_S$ and $I_S$ (as shown in FIG. 3). In one embodiment, $\theta$, which is an angular separation between the $V_S$ and $I_S$ may be determined by the PFA module 408 using time separation between zero-cross detection (ZCD) of these input signals. Alternatively, in another embodiment, a standard three-phase active/reactive power block may be implemented into the PFA module 408 that computes the three-phase real power ($P_S$) and reactive power ($Q_S$) associated with a periodic set of three-phase voltage and current values. In yet another embodiment, θ may be determined by calculating real power $P_S$, reactive power $Q_S$, and apparent power S based on the received $V_S$ and $I_S$, $P_S$, $Q_S$, and S may be calculated using the following equations:

$$\theta = \cos^{-1}\left(\frac{P_S}{S}\right) \qquad \text{eq-1}$$

$$S = \sqrt{P_S^2 + Q_S^2} \qquad \text{eq-2}$$

Alternatively, in some embodiments, the PFA module 408 may be configured to determine δ by using one or more transducers that may be deployed in the generator control panel or in the I/O unit 124. In such embodiments, the transducers may be configured to measure $V_S$ and $I_S$, and further configured to provide measured power parameters to the PFA module 408. The above equations 1 and 2 may then be used to calculate θ.

As shown in FIG. 4, in some embodiments, the protection scheme 402 further includes an impedance angle determination module 410 (herein referred to as "IA module 410") that may be configured to receive the determined $\delta_1$ outputted from the RPA module 404, the determined θ outputted from the PFA module 408, and the samples of $I_S$ from the filters 406. In one embodiment, the IA module 410 may be further configured to obtain d-axis ($I_d$) and q-axis ($I_q$) components of the $I_S$ using d-q axis conversion of the measured $I_S$. In another embodiment, the IA module 410 may be further configured to determine an impedance angle (α), as shown in FIG. 3, based on the received data. In some embodiments, α may be determined using the following equations:

$$\alpha = \tan^{-1}\left[\frac{I_d \times \cos(\delta_1 + \theta) - I_q \times \sin(\delta_1 + \theta)}{I_s - \{I_d \times \sin(\delta_1 + \theta)\} - \{I_q \times \cos(\delta_1 + \theta)\}}\right] \qquad \text{eq-5}$$

Further, in some embodiments, the outputs of the PFA module 408 and the IA module 410 may be provided as inputs to the SFE module 202. Alternatively, in some embodiments, the outputs of the RPA module 404, the PFA module 408, and the IA module 410 may be provided as inputs to the SFE module 202. In some embodiments as described above in conjunction with FIG. 2, the SFE module 202 may be configured to calculate the safety factor as a ratio of $V_S$ and SCV. In one embodiment, the ratio may be determined based on real-time measured data and various angles ($\delta_1$, θ, and α) determined by the protection scheme 402. The equations used to estimate the stability factor from the determined angles are described later. The interfacing of the SFE module 202 with the comparison and decision modules 204 and 206 may be the same as the one described earlier.

Although the I/O unit 124 is not shown in FIG. 4, but the I/O unit 124 may be used as an interface to receive real-time data and sample analog data, in which case the modules in the device 400 may directly interface with the I/O unit 124 to gather the sampled data.

Various embodiments for determining θ and α have been described above. In order to calculate the safety factor, $\delta_1$ is also to be determined in addition to θ and α. FIG. 5 provides a graphical representation 500 for determining $\delta_1$ using the RPA module 404, in accordance with one embodiment of the invention. FIG. 5 represents five graphs with the X-axis in each graph representing time in seconds and the Y-axis representing 'pu' values for various parameters. The RPA module 404 may determine $\delta_1$ based on the parameters shown on the Y-axis and the connection status, in accordance with some embodiments.

In some embodiments when the connection status is open, rotor position pulse is 3000 pulses per minute for a 50 Hz system and 3600 pulses per minute for a 60 Hz system, and $V_S$ is present, a turbine (not shown) connected to the source-end generator 108 may operate at a full speed no-load (FSNL) condition and excitation system is considered ON. At this point, the RPA module 404 may compare the received rotor position pulses with ZCD of $V_s$ (under FSNL condition), both observed during a time period '$T_1$', as shown by two dashed vertical arrows 502 in FIG. 5. In one embodiment, a flip-flop (not shown in FIG. 5) may be used to generate a square waveform such that an output is set high when the rotor position pulse is observed, and is reset to low (zero) when ZCD of $V_s$ (for FSNL condition) is observed. As shown in FIG. 5, the width of this square waveform defines a calibration error ($T_{cal}$) between the rotor position determination device 112 and the voltage transformer 114. $T_{cal}$ is measured so as to remove this error in subsequent measurements, in accordance with one embodiment.

In some embodiments when the connection status is determined to be closed, the source-end generator 108 may operate under an on-load condition, that is, the source-end generator 108 is operational and provides power to one or more electrical loads connected across the system 100. In some embodiments, the phenomenon of armature reaction in units on load results in the stator and rotor rotating frames to slip until they are locked, where the armature reaction torque compensates the electromechanical torque. At this point, the RPA module 404 may compare the rotor position pulses with ZCD of Vs (for on-load condition), both observed during a time period '$T_2$', as shown by two dashed vertical arrows 504 in FIG. 5. In one embodiment, a flip-flop (not shown in FIG. 5) may be used to generate a square waveform such that an output is set high when the rotor position pulse is observed, and is reset to low (zero) when ZCD of Vs (for on-load condition) is observed. As shown in FIG. 5, the width of this square waveform defines a RPA time pulse (T) of $V_S$ when loaded with respect to the rotor position. In some embodiments, $T_{cal}$ may be subtracted from T to obtain a time period for $\delta_1$ ($T_{\delta_1}$), which may be used to calculate $\delta_1$ as given in the following equations 6 and 7:

$$T_{\delta_1} = T - T_{cal} \qquad \text{eq-6}$$

$$\delta_1 = \frac{T_{\delta_1}}{TC} \times 360° \qquad \text{eq-7}$$

where, TC represents a time constant, which is inverse of the frequency of the source-end generator 108, for example, 20 milliseconds (ms) for a 50 Hz system and 16.7 ms for a 60 Hz system. In some embodiments, the utility operator or the protection engineer may configure TC based on system application.

In some embodiments, the RPA module 404 may determine $\delta_1$ for each phase voltage, using the current feedback, the rotor position, and the connection status. Various $\delta_1$ determined for each phase voltage are then compared with each other. In embodiments wherein this comparison results in difference of, for example, greater than two degrees, the device 400 may trigger a fault and the protection scheme 402 may be deactivated.

As mentioned earlier, in some embodiments, the determined angles, that is, $\delta_1$, $\theta$, and $\alpha$ are inputted to the SFE module 202 to estimate the safety factor as a function of $V_S$ and SCV. In one embodiment, the function may be a ratio of $V_S$ and SCV. The estimation of the safety factor will now be described in conjunction with FIGS. 3 and 6. FIG. 3 is a vector phasor representation 300 of the two sources, that is, the source-end 102 and the receiving-end 104, in accordance with one embodiment of the invention. FIG. 3 depicts various source-end 102 parameters, such as an internal voltage ($E_S$) at the source-end generator 108, $V_S$, and $I_S$ that are plotted on the left side of an axis O'-O''. Similarly, the receiving-end 104 parameters, such as an internal voltage ($E_R$) and a terminal voltage ($V_R$) of any of the receiving-end generator(s) 110 or a group of receiving end generators are plotted on the right side of the axis O'-O''. As shown in FIG. 3, the SCV is along the axis O'-O'' for an embodiment where $E_S$ may be equal to $E_R$. In some embodiments, a component of $\alpha$ may be used to determine an angle between $I_S$ and SCV. By applying trigonometry, the angle between $I_S$ and SCV is determined to be "90-$\alpha$". In some embodiments, $E_S$ may be equal to $E_R$ such that the left and right sides of the axis O'-O'' may be symmetrical. In such embodiments, $\delta$ may be considered to be divided into two equal halves such that $\delta$ may be calculated by:

$$\delta = (\xi)*2 \qquad \text{eq-8}$$

In one embodiment wherein the relationship between $E_S$ and $E_R$ is not known, in order to calculate the safety factor, a variable angle $\xi$ (shown in FIG. 6) may be calculated using the following equation:

$$\xi = \delta_1 + \theta + (90 - \alpha) \qquad \text{eq-9}$$

where, $\beta$ represents an angular shift

FIG. 6 is a vector phasor representation 600 of the two sources, that is, the source-end 102 and the receiving-end 104 where $E_S$ is greater than $E_R$, in accordance with another embodiment of the invention. In some embodiments, the variation of SCV is inversely proportional to S. As shown in FIG. 6, the vortex of angles shown in FIG. 3 (when $E_S$ is equal to $E_R$) moves from the O'-O'' axis to a Q'-Q'' axis since $E_S$ is greater than $E_R$. In another embodiment where $E_R$ is greater than $E_S$, the vortex moves to the left of O'-O''. The shift on either side of O'-O'' depends on the ratio between $E_S$ and $E_R$. In some embodiments, the shift may be $\beta$ as illustrated in FIG. 6. By applying trigonometry in FIG. 6, the relationship between $E_S$ and $E_R$ is obtained using the following equations:

$$E_S \times \cos(\xi + \beta) = E_R \times \cos(\xi - \beta) \qquad \text{eq-10}$$

$$k = \frac{E_S}{E_R} \qquad \text{eq-11}$$

where, k represents a voltage ratio between $E_S$ and $E_R$

By inputting the formula of k from equation 11 in equation 10, the following equation is obtained:

$$k \times \cos(\xi + \beta) = \cos(\xi - \beta) \qquad \text{eq-12}$$

Further, by inputting the formula of $\xi$ from equation 9 in equation 12, $\beta$ may be calculated as follows:

$$\beta = \tan^{-1}\left[\left(\frac{k-1}{k+1}\right) \times \tan(\alpha - \delta_1 - \theta)\right] \qquad \text{eq-13}$$

Once $\beta$ is calculated, using trigonometric relations in FIG. 6, the SFE module 202 may determine the safety factor as a ratio of $V_S$ and SCV using the following equation:

$$V_S \times \cos[\theta + (90 - \alpha)] = SCV \times \cos \beta \qquad \text{eq-14}$$

Further, by inputting the formula of $\beta$ from equation 13 in equation 14, the safety factor (SF) may be calculated as follows:

$$SF|_{k=0.9}^{1.10} = \frac{\cos\left[\tan^{-1}\left\{\frac{(k-1)}{(k+1)} \times \tan(\alpha - \delta_1 - \theta)\right\}\right]}{\sin(\alpha - \theta)} \qquad \text{eq-15}$$

As shown in equation 15, in some embodiments, the safety factor may be a function of $\theta$, $\alpha$, $\delta_1$, and k. In embodiments where the value for k is not known, different values of k may be applied in the equation 15 to determine safety factors for different values of k. In one exemplary embodiment as shown in equation 15, different values of k ranging from 0.9 to 1.1 may be applied to determine $SF_{k=0.9}$, $SF_{k=0.95}$, $SF_{k=1}$, $SF_{k=1.05}$, and $SF_{k=1.1}$. It will be apparent to a person skilled in the art to use any other value or range of k without deviating from the scope of the invention. The range of k considered above may be extended to 0.8 to 1.2, in accordance with one exemplary embodiment. Various values of k above may be considered depending on the over and under voltage operating range of the system under consideration, in accordance with some embodiments.

In another embodiment wherein $E_S$ is equal to $E_R$ (as shown in FIG. 3), the calculation of safety factor is similar to that described in the earlier embodiment where $E_S$ is greater than $E_R$, except that $\beta = 0$ and $k = 1$ when $E_S$ is equal to $E_R$. Inputting these values of $\beta$ and k in equation 15, the safety factor (SF) for the condition where $E_S$ is equal to $E_R$ may be calculated using the following equation:

$$SF_{k=1} = \frac{1}{\sin(\alpha - \theta)} \qquad \text{eq-16}$$

As shown in equation 16, in some embodiments, the safety factor may be a function of $\theta$, $\alpha$, and k, where k=1. In yet another embodiment where $E_S$ is less than $E_R$ (not shown), the calculation of safety factor is similar to that described in the embodiment where $E_S$ is greater than $E_R$.

In some embodiments, the stability factor may be the decisive factor for retaining the source-end generator 108 in operation, or triggering an alarm or a generator circuit breaker trip event, based on whether the power swing is stable or unstable. In one embodiment, the stability or instability may be determined based on a comparison of the stability factor with the defined safety limit. In some embodiments, a plurality of stability factors may be estimated at different time periods. In such embodiments, the comparison module 204 may compare such stability factors with the defined safety limit. In other embodiments, the stability factors at various values of k may be compared with the defined safety limit. As mentioned above, in some embodiments, the defined safety limit may include a first defined safety limit or a second defined safety limit. In other embodiments, the stability factor (s) may be compared with a plurality of defined safety limits.

An exemplary embodiment where the estimated safety factors may be compared with the plurality of defined safety limits is illustrated in FIG. 7. FIG. 7 depicts a graphical representation 700 of time delayed triggering of alarm or generator circuit breaker trip action based on the estimated safety factors, in accordance with one embodiment of the invention. As shown in FIG. 7, δ (in degrees) is shown on X' axis, the defined safety limits (for example, $Lt_{1-}$, $Lt_1$, $Lt_{1+}$, $Lt_{2-}$, $Lt_2$, and $Lt_{2+}$ obtained from δ) are shown on X" axis, and time delay (in milliseconds) is shown on Y-axis. FIG. 7 considers the first defined safety factor ($Lt_1$), at which the alarm may be triggered, to be obtained from δ equal to 90 degrees, and considers the second defined safety factor ($Lt_2$), at which the generator circuit breaker trip action may be triggered, to be obtained from δ equal to 120 degrees. It should be noted that the invention is not limited to using 90 and 120 degrees as standard values of δ for triggering alarm and generator circuit breaker trip action, respectively. The utility operator or protection engineer may use different values of δ for determining different defined safety limits at which alarm and generator circuit breaker trip action may be triggered.

In some embodiments, degrees (δ) may be converted to pu values (defined safety limits) since the safety factors estimated using the equation 15 or 16 provide ratios (in pu). Therefore, the comparison module 204 may compare the pu values of safety factors with pu values of defined safety limits, in accordance with one embodiment. In some exemplary embodiments, the defined safety limits (in pu) may be calculated from δ (in degrees) as given in the Table 1 below.

reached $Lt_1$, the decision module 206 may trigger or raise an alarm. In other embodiments, the alarm may be raised when the estimated safety factor exceeds $Lt_1$. In one exemplary embodiment, the decision module 206 may generate an out-of-step alarm pick-up to indicate that $Lt_1$ has reached or being exceeded, and thus an alarm may be raised. In some embodiments, the alarm may be further used to provide power swing blocking (PSB) for other conventional protective functions like distance protection that are generally sensitive to power swing. In some other embodiments where the comparison indicates that the estimated safety factor has reached or exceeded $Lt_2$, the decision module 206 may trigger a generator circuit breaker trip action. In an exemplary embodiment, an OST pick-up may be generated to indicate that $Lt_2$ has reached or exceeded, and thus a generator circuit breaker trip action may be triggered.

In some embodiments, the alarm may be triggered when the safety factors estimated over a period of time indicates unidirectional increase and the safety factor values are equal to or greater than $Lt_{1-}$ and $Lt_1$. In embodiments where subsequent to triggering the alarm the power swing still persists, the protection scheme (132 or 402) may monitor any further increase in the safety factor by regularly comparing the estimated safety factors with the defined safety limits. In some embodiments subsequent to triggering the alarm, if the safety factors monitored are estimated to be less than $Lt_1$, the alarm may be discontinued. In one exemplary embodiment, the alarm may be discontinued if the estimated safety factors are less than both $Lt_{1-}$ and $Lt_1$. However, in some other embodiments, the alarm may be continued if the estimated safety factors are less than $Lt_1$ but more than $Lt_{1-}$, that is, if the

TABLE 1

Defined Safety Limit Calculation

| Limit | Default Value k | Default Limit δ | Determined from RPA $δ_1$ | Safety Limit Calculation α-δ1-θ | α-θ | Safety Limit | Condition |
|---|---|---|---|---|---|---|---|
| $Lt_1$ | 0.9 | 90 | 2 | 45 | 47 | 1.36544 | $E_S < E_R$ |
|  | 0.95 | 90 | 2 | 45 | 47 | 1.36688 |  |
|  | 1 | 90 | 2 | 45 | 47 | 1.36733 | $E_S = E_R$ |
|  | 1.05 | 90 | 2 | 45 | 47 | 1.36692 | $E_S > E_R$ |
|  | 1.1 | 90 | 2 | 45 | 47 | 1.36578 |  |
| $Lt_2$ | 0.9 | 120 | 2 | 30 | 32 | 1.88621 | $E_S < E_R$ |
|  | 0.95 | 120 | 2 | 30 | 32 | 1.88687 |  |
|  | 1 | 120 | 2 | 30 | 32 | 1.88708 | $E_S = E_R$ |
|  | 1.05 | 120 | 2 | 30 | 32 | 1.88689 | $E_S > E_R$ |
|  | 1.1 | 120 | 2 | 30 | 32 | 1.88637 |  |

Table 1 above considers that δ1 determined from the RPA module 404 (for example, using equations 6 and 7) is 2. Since $δ_1$ determined from the RPA module 404 is in degrees, $δ_1$ in degrees may be converted into equivalent radians. Based on determined $δ_1$, the defined safety limits ($Lt_{1-}$, $Lt_1$, $Lt_{1+}$, $Lt_{2-}$, $Lt_2$, and $Lt_{2+}$) may change dynamically. Also, the table 1 shows the calculations for defined safety limits for only $Lt_1$ and $Lt_2$. Similarly, the defined safety limits may be calculated for other limits ($Lt_{1-}$, $Lt_{1+}$, $Lt_{2-}$, and $Lt_{2+}$), in accordance with one embodiment.

As described earlier, the safety factors may be estimated from the determined angles, that is, $δ_1$, θ, and α for different values of k. The comparison module 204 may then compare these safety factors with the defined safety limits. In some embodiments, the safety factors may be compared with $Lt_{1-}$, $Lt_1$, $Lt_{1+}$, $Lt_{2-}$, $Lt_2$, and $Lt_{2+}$. In some embodiments where the comparison indicates that the estimated safety factor has estimated safety factors are within an alarm zone 702 (shown by a dashed rectangular box). As shown in FIG. 7, in some embodiments, the alarm zone 702 is defined for a range between $Lt_{1-}$ and $Lt_{1+}$. In some other embodiments, the utility operator may define the range for the alarm zone 702 different from $Lt_{1-}$ to $Lt_{1+}$.

In some embodiments, the generator circuit breaker trip action may be triggered when the safety factors indicate unidirectional increase and have values greater than $Lt_{1-}$, $Lt_1$, $Lt_{1+}$, and $Lt_{2-}$, or equal to $Lt_2$, or both. Similar to the embodiments described above for preclusion or deactivation of the alarm, a trip command to the circuit breaker 118 may also be precluded or deactivated (that is, the circuit breaker 118 is closed). In one exemplary embodiment, the generator circuit breaker trip action may be continued when the safety factors estimated over a period of time are within a trip zone 704 (shown by a dashed rectangular box). As shown in FIG. 7, in some embodiments, the trip zone 704 is defined for a range between $Lt_{2-}$ and $Lt_{2+}$. In some other embodiments, the utility operator may define the range for the trip zone 704 different from $Lt_{2-}$ to $Lt_{2+}$.

In one embodiment, the protection scheme may be provided with preset time delays to compensate for oscillations during power swings. In such embodiments, the protection scheme may reject safety factor values or use them after a preset time delay, if the safety factor values are frequently fluctuating (as determined over a period of time), in order to delay the triggering of alarm or generator circuit breaker trip action.

In some embodiments, an alarm may be triggered when the safety factor is equal to or greater than $Lt_1$, and the generator circuit breaker trip action may be triggered when the safety factor is equal to or greater than $Lt_2$. In some embodiments, for different values of k, for example, k=0.9, k=1, k=1.05, and k=1.1, the decision module 206 may decide whether to retain the source-end generator 108 in operation or to trigger the alarm or to isolate the source-end generator 108, based on whether the power swing is stable or unstable.

In some other embodiments, the decision module 206 may take the decision based on determined safety factors (which indicate whether the power swing is stable or unstable) and time delay. In an exemplary embodiment, the decision module 206 may trigger the alarm or generator circuit breaker trip action after a certain time delay, which is either defined using inverse definite minimum time (IDMT) characteristics for different values of k, or configured by the utility operator or protection engineer for different values of k. For example, as illustrated in FIG. 7, when SF determined for k=0.9 is equal to or greater than $Lt_2$, a generator circuit breaker trip action is triggered after a time delay of $T_5$ seconds. Similarly, as illustrated in FIG. 7, when SF determined for same value of k=0.9 is equal to or greater than $Lt_1$, an alarm is triggered after a time delay of $T_4$ seconds, which is more than $T_5$ seconds after which the generator circuit breaker trip action is triggered. As shown in FIG. 7, the decision is made based on IDMT characteristics where for same value of k, the time delay is less for a higher fault current (that is, in case generator circuit breaker trip action is to be triggered), whereas the time delay is more for a relatively lower fault current (that is, in case alarm is to be triggered).

As shown in FIG. 7, in some embodiments, different time delays may be defined for different values of k. For example, as shown in FIG. 7, when safety factor values determined for k=0.9 and k=1.1 are equal to or greater than $Lt_1$, the time delay after which the alarm is triggered for k=0.9 is $T_4$ seconds, whereas the time delay after which the alarm is triggered for k=1.1 is $T_3$ seconds. However, in some other embodiments, the decision module 206 may configure least time delays, which can be same or different for various values of k, without deviating from the scope of the invention.

In one embodiment, a method for generator protection is presented. FIG. 8 is a flowchart depicting a method 800 for protection of a source-end generator (such as 108), in accordance with one embodiment of the invention. The method 800 detects whether the power swing event is stable or unstable based on real-time data measurement, in some embodiments. In some embodiments, a protection device such as a relay may be provided with a protection scheme (such as 132) to detect power swing event between the source-end generator and receiving-end generator(s) (such as 110). At step 802, a safety factor for the source-end generator is estimated as a function of $V_S$ and SCV. In some embodiments, the function may be a ratio of $V_S$ and SCV. In certain embodiments, a SFE module (such as 202) in the protection scheme may determine the ratio based on real-time data measurement and various angles determined by another protection scheme, as described earlier.

At step 804, the estimated safety factor is compared with a defined safety threshold limit. The determination as to whether the estimated safety factor is below or above the defined safety limit(s) may be performed by a comparison module (such as 204) in the protection scheme, in accordance with some embodiments.

Further at step 806, at least one of an alarm or a generator circuit breaker trip action is triggered, based on the comparison between the estimated safety factor and the defined safety threshold limit. In one embodiment, a decision module (such as 206) in the protection scheme may trigger the alarm when the estimated safety factor is equal to or above a first defined safety limit. In another embodiment, the generator circuit breaker trip action may be triggered when the estimated safety factor is equal to or above a second defined safety limit. In some embodiments, the second defined safety limit may be greater than the first defined safety limit.

Alternatively, in some embodiments, after estimating the safety factor at step 802, the presence of a fault may be detected at step 808. In some embodiments, the protection scheme may monitor the fault such as a phase-phase fault or a ground fault at a component proximal to the source-end generator. In one embodiment, a fault detection module (such as 208) in the protection scheme may monitor the fault at a step-up transformer associated with the source-end generator. In another embodiment, the fault may be monitored at a line-side circuit breaker that may be configured to electrically connect or disconnect individual power lines.

If no fault is detected at step 808, the method 800 moves to step 804 where the estimated safety factor is compared with the defined safety limit. Thereafter, the step 806 may be executed.

However, if a fault is detected at step 808, the method 800 moves to step 802 where the safety factor is continuously monitored in real-time. Thereafter, at step 808 if the fault is still detected, the monitoring at step 802 is continued. This loop may continue until the fault at step 808 is cleared or not detected. In some embodiments, the detection of the fault may trigger the deactivation of some or all modules of the protection scheme. In one exemplary embodiment, the detection of fault may trigger the fault detection module to send a disable signal to the comparison module and the decision module such that the triggering of alarm and the generation circuit breaker trip action may be precluded, that is, if they are not already triggered. In some embodiments, a G60 UR series of relays or the like may be used to trip a circuit breaker (such as 118) associated with the source-end generator in the event of the fault detection.

FIG. 9 is a flowchart depicting a method 900 for protection of the source-end generator, in accordance with another embodiment of the invention. Similar to the method 800, the method 900 detects whether the power swing event is stable or unstable based on real-time data measurement. In some embodiments, a protection device such as a relay may be provided with a protection scheme (such as 132 or 402) to detect power swing event. Steps 902 to 908 describe the process for receiving data in real-time and measuring various angles based on the received data.

At step 902, real-time data such a rotor position, $V_S$, $I_S$, and a connection status of the source-end generator is received. In one embodiment, an I/O unit (such as 124) may be configured to receive the rotor position, $V_S$, $I_S$, and connection status from, but not limited to, a rotor position determination unit (such as 112), a voltage transformer (such as 114), a current transformer (such as 116), and a circuit breaker (such as 118), respectively. The rotor position, $V_S$, and $I_S$ may be analog inputs, in accordance with certain embodiments. In some other embodiments, the I/O unit may be configured to convert the received analog input into digital samples.

In some embodiments, an RPA module (such as 404) in the protection scheme may be configured to receive the connection status, and the samples of the rotor position and $V_S$ from the I/O unit. At step 904, $\delta_1$ is determined between $E_S$ and received $V_S$, based on received data, such as, rotor position, connection status, and $V_S$. In certain embodiments, the RPA module may be configured to determine $\delta_1$ between $E_S$ and received $V_S$, based on the received data as described earlier.

In some embodiments, the protection scheme may further include a PFA module (such as 408) that may be configured to receive the samples of $V_S$ and $I_S$ from the I/O unit. At step 906, $\theta$ at the source-end generator 108 may be determined between received $V_S$ and $I_S$. In certain embodiments, the RPA module may be configured to determine $\theta$ as described earlier.

In some embodiments, the protection scheme may further include an IA module (such as 410) that may be configured to receive the determined $\delta_1$, the determined $\theta$, and the samples of $I_S$ (such as from the I/O unit). At step 908, $\alpha$ at the source-end generator may be determined based on the determined $\delta_1$, determined $\theta$, and $I_S$. In certain embodiments, the IA module may be configured to determine $\alpha$ as described earlier.

Once the angles are determined at steps 904, 906, and 908, a safety factor for the source-end generator may be estimated. In some embodiments, the outputs of the PFA module and the IA module may be provided as inputs to an SFE module (such as 202) in the protection scheme. Alternatively, in some embodiments, the outputs of the RPA module, the PFA module, and the IA module may be fed as inputs to the SFE module. At step 910, the safety factor is estimated as a function of at least $\theta$, $\alpha$, and k. In one embodiment where $E_S$ is equal to $E_R$ (as shown in FIG. 3), the safety factor may be determined as a function of $\theta$, $\alpha$, and k (where k=1), as given in the equation 16. In one embodiment where $E_S$ is less than or greater than $E_R$, the safety factor may be determined as a function of $\theta$, $\alpha$, $\delta 1$, and k, as given in the equations 15.

At steps 912 and 914, an alarm, a generator circuit breaker trip action, or both may be triggered as a result of a comparison between the estimated safety factor and a defined safety limit.

Alternatively, in some embodiments similar to those described above in the method 800, after estimating the safety factor at step 910, the presence of a fault may be detected at step 916. The fault detection approach here may be similar to that described above at step 808. If no fault is detected at step 916, the method 900 moves to step 912 where the estimated safety factor is compared with the defined safety threshold. Thereafter, the step 914 is executed.

However, if the fault is detected at step 916, the method 900 moves to step 902 where the data is monitored again in real-time. Thereafter, steps 904, 906, 908, and 910 will be executed. After step 910, the protection scheme may again detect for the presence of the fault at step 916. This loop can continue until the fault at step 916 is cleared or not detected. Similar to the method 800, in some embodiments, the detection of the fault at step 916 may trigger the deactivation of some or all modules of the protection scheme.

The devices, systems, and methods in accordance with embodiments of the invention may obviate the need for system frequency settings for unstable power swing detection and isolation of generators during such events using the protection scheme in various embodiments. Further, the protection scheme described above in conjunction with various embodiments may detect power swings, and may then decide to either retain a source-end generator in operation or may isolate the generator with a high degree of selectivity, reliability and dependability, based on whether the power swing is stable or unstable. The selectivity and dependability may be achieved, at least in part, by eliminating or at least reducing the extensive power system simulation study and adapting to any variation in the system configurations, for example, due to change in transmission and distribution layout during implementation phase or dynamically during operational phase.

Various embodiments of the invention may further provide desired speed and equipment safety that the protection system requires. The speed may be achieved by real-time measurement of data, where this real-time measured data is then used to estimate the safety factor. Due to real-time data measurement, the probability of aggravation of the system disturbance may be reduced by timely triggering of an alarm or a generator circuit breaker trip action repeatedly. Equipment safety may be achieved by avoiding any uncontrolled tripping of circuit breakers, which may otherwise cause equipment damage or pose a safety concern for utility operators. Additionally, various embodiments of the invention may preclude the need for determining data at the receiving end, and thereby preclude the need for time synchronization between data determined at the source end and that determined at the receiving end.

The devices, systems, and methods described in various embodiments of the invention may be applied to any type of protection device, and is not limited to UR family of protection. Various embodiments of the invention are not limited to use in application areas such as an electric grid or a microgrid, and may be extended to any other type of application areas in the electrical power system.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A generator protection device, comprising:
    a safety factor estimation module configured to estimate a safety factor as a function of a terminal voltage ($V_S$) of a source-end generator, and a swing center voltage (SCV) between the source-end generator and a receiving-end generator;
    a comparison module configured to compare an estimated safety factor with a defined safety threshold limit; and
    a decision module configured to trigger at least one of an alarm or a generator circuit breaker trip action, based on the comparison between the estimated safety factor and the defined safety threshold limit.

2. The generator protection device of claim 1, wherein the function of the Vs and the SCV comprises a ratio of the Vs and the SCV.

3. The generator protection device of claim 1, further comprising:

a rotor position angle ($\delta_1$) determination module configured to receive a rotor position of the source-end generator, a connection status of the source-end generator, and the $V_S$, and further configured to determine a rotor position angle ($\delta_1$) between the received $V_S$ and an internal voltage ($E_S$) of the source-end generator based on the received rotor position, the received source-end generator connection status, and the received $V_S$;

a power factor angle ($\theta$) determination module configured to receive the $V_S$ and a terminal current ($I_S$) of the source-end generator, and further configured to determine a power factor angle ($\theta$) between the received $V_S$ and the received $I_S$; and an impedance angle ($\alpha$) determination module configured to determine an impedance angle ($\alpha$) based on the determined $\delta_1$, the determined $\theta$, and the $I_S$.

4. The generator protection device of claim 3, wherein the safety factor estimation module is configured to estimate the safety factor as a function of the determined $\theta$, the determined $\alpha$, and a voltage ratio (k).

5. The generator protection device of claim 3, wherein the safety factor estimation module is configured to estimate the safety factor as a function of the determined $\theta$, the determined $\alpha$, the determined $\delta_1$, and a voltage ratio (k).

6. The generator protection device of claim 1, wherein:
the safety factor estimation module is further configured to estimate a plurality of safety factors over a period of time, and
the comparison module is further configured to compare the estimated plurality of safety factors with the defined safety threshold limit.

7. The generator protection device of claim 6, wherein the decision module is further configured to perform at least one of deactivation of the alarm or preclusion of the generator circuit breaker trip action, based on the comparison between the plurality of estimated safety factors and the defined safety threshold limit.

8. A generator protection device, comprising:
a rotor position angle ($\delta_1$) determination module configured to receive a rotor position, a connection status, and a terminal voltage ($V_S$) of a source-end generator, and further configured to determine a rotor position angle ($\delta_1$) between the received $V_S$ and an internal voltage ($E_S$) of the source-end generator based on the received rotor position, the received source-end generator connection status, and the received $V_S$;
a power factor angle ($\theta$) determination module configured to receive the $V_S$ and a terminal current ($I_S$) of the source-end generator, and further configured to determine a power factor angle ($\theta$) between the received $V_S$ and the received $I_S$;
an impedance angle ($\alpha$) determination module configured to determine an impedance angle ($\alpha$) based on the determined $\delta_1$, the determined $\theta$, and the $I_S$;
a safety factor estimation module configured to estimate a safety factor as a function of at least the determined $\theta$, the determined $\alpha$, and a voltage ratio (k);
a comparison module configured to compare an estimated safety factor with a defined safety threshold limit; and
a decision module configured to trigger at least one of an alarm or a generator circuit breaker trip action, based on the comparison between the estimated safety factor and the defined safety threshold limit.

9. The generator protection device of claim 8, wherein the safety factor estimation module is configured to estimate the safety factor as a function of the determined $\theta$, the determined $\alpha$, the determined $\delta_1$, and the voltage ratio (k).

10. An electrical power system, comprising:
a receiving-end generator;
a source-end generator configured to be electrically coupled to the receiving-end generator; and
a generator protection device, comprising:
a safety factor estimation module configured to estimate a safety factor as a function of a terminal voltage ($V_S$) of the source-end generator, and a swing center voltage (SCV) between the source-end generator and the receiving-end generator,
a comparison module configured to compare an estimated safety factor with a defined safety threshold limit, and
a decision module configured to trigger at least one of an alarm or a generator circuit breaker trip action, based on the comparison between the estimated safety factor and the defined safety threshold limit.

11. The electrical power system of claim 10, wherein the function of the Vs and the SCV comprises a ratio of the Vs and the SCV.

12. The electrical power system of claim 10, wherein the generator protection device further comprises:
a rotor position angle ($\delta_1$) determination module configured to receive a rotor position of the source-end generator, a connection status of the source-end generator, and the $V_S$, and further configured to determine a rotor position angle ($\delta_1$) between the received $V_S$ and an internal voltage ($E_S$) of the source-end generator based on the received rotor position, the received source-end generator connection status, and the received $V_S$;
a power factor angle ($\theta$) determination module configured to receive the $V_S$ and a terminal current ($I_S$) of the source-end generator, and further configured to determine a power factor angle ($\theta$) between the received $V_S$ and the received $I_S$; and
an impedance angle ($\alpha$) determination module configured to determine an impedance angle ($\alpha$) based on the determined $\delta_1$, the determined $\theta$, and the $I_S$.

13. The electrical power system of claim 12, wherein the safety factor estimation module is configured to estimate the safety factor as a function of the determined $\theta$, the determined $\alpha$, and a voltage ratio (k).

14. The electrical power system of claim 12, wherein the safety factor estimation module is configured to estimate the safety factor as a function of the determined $\theta$, the determined $\alpha$, the determined $\delta_1$, and a voltage ratio (k).

15. The electrical power system of claim 10, further comprising:
a source-end generator circuit breaker configured to electrically couple the source-end generator with the receiving-end generator;
at least one voltage transformer for measuring the $V_S$;
at least one current transformer for measuring a terminal current ($I_S$) of the source-end generator; and
a rotor position determination device configured to determine a rotor position of the source-end generator.

16. A method, comprising:
(i) estimating a safety factor as a function of a terminal voltage ($V_S$) of a source-end generator, and a swing center voltage (SCV) between the source-end generator and a receiving-end generator;
(ii) comparing an estimated safety factor with a defined safety threshold limit; and
(iii) triggering at least one of an alarm or a generator circuit breaker trip action, based on the comparison between the estimated safety factor and the defined safety threshold limit.

17. The method of claim 16, wherein the function of the Vs and the SCV comprises a ratio of the Vs and the SCV.

18. The method of claim 16, further comprising:
receiving a rotor position, a connection status, the $V_S$, and a terminal current ($I_S$) of a source-end generator;
determining a rotor position angle ($\delta_1$) between the received $V_S$ and an internal voltage ($E_S$) of the source-end generator based on the received rotor position, the received source-end generator connection status, and the received $V_S$;
determining a power factor angle ($\theta$) between the received $V_S$ and the received $I_S$; and
determining an impedance angle ($\alpha$) based on the determined $\delta_1$, the determined $\theta$, and the $I_S$.

19. The method of claim 18, wherein the step (i) comprises estimating the safety factor as a function of the determined $\theta$, the determined $\alpha$ and a voltage ratio (k).

20. The method of claim 18, wherein the step (i) comprises estimating the safety factor as a function of the determined $\theta$, the determined $\alpha$, the determined $\delta 1$, and a voltage ratio (k).

\* \* \* \* \*

UNITED STATES PATENT AND TRADEMARK OFFICE
CERTIFICATE OF CORRECTION

PATENT NO.         : 8,773,829 B2
APPLICATION NO.    : 13/665584
DATED              : July 8, 2014
INVENTOR(S)        : Som et al.

Page 1 of 1

It is certified that error appears in the above-identified patent and that said Letters Patent is hereby corrected as shown below:

In the Specification

Column 11, Line 44, delete "to S." and insert -- to $\delta$. --, therefor.

Column 13, Line 50, delete "that 81" and insert -- that $\delta_1$ --, therefor.

Signed and Sealed this
Twenty-fifth Day of November, 2014

Michelle K. Lee
*Deputy Director of the United States Patent and Trademark Office*